No. 791,473. PATENTED JUNE 6, 1905.
J. H. & A. S. KELLOGG, H. C. JEFFERS & W. K. KELLOGG.
PROCESS OF HULLING SEEDS.
APPLICATION FILED NOV. 25, 1901.
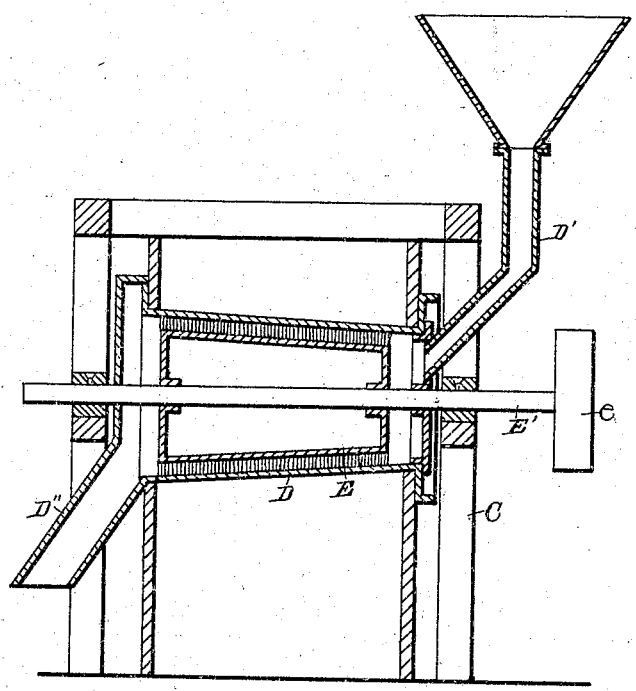
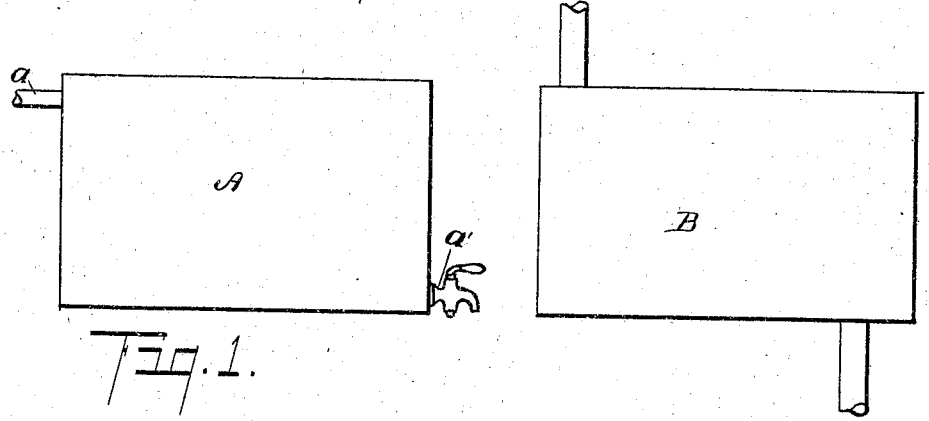
Witnesses:
Otis Q Earl
Adelaide S Adams
Inventors
John Harvey Kellogg, Arthur S Kellogg, Herbert Jeffers
and Will K Kellogg
By Fred L Chappell
Att'y.

No. 791,473.

Patented June 6, 1905.

UNITED STATES PATENT OFFICE.

JOHN HARVEY KELLOGG, ARTHUR S. KELLOGG, HERBERT C. JEFFERS, AND WILL K. KELLOGG, OF BATTLECREEK, MICHIGAN, ASSIGNORS TO THE SANITAS NUT FOOD COMPANY, OF BATTLECREEK, MICHIGAN.

PROCESS OF HULLING SEEDS.

SPECIFICATION forming part of Letters Patent No. 791,473, dated June 6, 1905.

Application filed November 25, 1901. Serial No. 83,647.

*To all whom it may concern:*

Be it known that we, JOHN HARVEY KELLOGG, ARTHUR S. KELLOGG, HERBERT C. JEFFERS, and WILL K. KELLOGG, citizens of the United States, residing at the city of Battlecreek, in the county of Calhoun and State of Michigan, have invented certain new and useful Improvements in the Process of Hulling Seeds, of which the following is a specification.

This invention relates to an improved process of hulling beans, peas, lentils, or similar seeds or grains.

The object of this invention is to provide a process which shall be rapid and efficient and which will at the same time separate the hulls from the beans without injuring the kernels within and whereby the same will be effected very rapidly without the use of any special machine other than is now found in flouring-mills.

Minor objects will definitely appear in the detailed description to follow.

We accomplish the objects of our invention by the devices and means described in this specification.

The invention is clearly defined and pointed out in the claims.

An apparatus for use in carrying out our invention is clearly illustrated in the accompanying drawings, forming a part of this specification, in which—

Figure 1 is a side elevation, in conventional form, of a soaking-tank used in carrying out our process. Fig. 2 is a side elevation view, in conventional form, of a dry-kiln used in carrying out our process. Fig. 3 is a vertical sectional view through a brushing or scouring machine used in freeing the hulls from the kernels in carrying out our process.

In the drawings, similar letters of reference refer to similar parts throughout the several views.

With beans and certain other seeds in their natural state the hulls adhere very closely and are very smooth on the outside, so that grinding them off in their dry state is next to impossible. This process has to do with effectually loosening these smooth hard hulls, so that they can be readily removed from the kernels within. The process, while especially adapted for the treatment of beans, is also very effective for the treatment of peas, lentils, and other seeds of like character.

In carrying out the process the grains or seeds are soaked until the skins or hulls are swelled. This may be done by soaking the same in cold water. However, in practice we submit the seeds or beans to the action of hot water for about one minute, when the hulls will be found to have been much expanded without the moisture penetrating to the kernels within. The soaking may be to such an extent that the kernels within may be swelled. The grains or seeds are then dried. Where the kernels have been soaked until they are swelled also, in the drying process the kernel within shrinks, while the hull in place of shrinking loosens and will pull free from the kernel within. The entire mass of seeds or grains when thoroughly dried is put through what millers denominate a "brush-machine," which breaks up the hulls, rubbing them off from the kernels and leaving the kernels entirely free from the hulls, when they can be separated in any usual or desired manner.

We have illustrated in the accompanying drawings an apparatus for use in carrying out our invention.

A tank, as A, is provided for soaking the beans. This tank is preferably provided with an inlet-pipe $a$ and an outlet $a'$, so that after the beans are properly soaked the water may be drawn off, so that the beans are conveniently removed from the tank. They are then placed in a dry-kiln, as B, which is here illustrated in conventional form. After drying the beans are passed through the scouring or brushing machine, preferably such as I have illustrated in Fig. 3, which consists of a suitable supporting-frame C, by which the horizontally-arranged conical cylinder D is supported. Supported within this cylinder on the shaft E' is a brush E.

The beans are delivered to the small end of the brushing or scouring cylinder by the hopper D'. The revolution of the brush E loosens the skins or hulls from the kernels and carries them forward to the delivery-spout D''. This leaves the hulls entirely free from the kernels, and they may be separated, as above stated, in the usual or any desired manner.

We are aware that there are numerous styles of brush or scouring machines which might be used to effectively loosen the hulls from the kernels after they are treated as we have described. The machine we have illustrated, however, is a very simple and effective one. The separating of the hulls and kernels is a very simple matter after passing through this machine, as the hulls are reduced to the condition of chaff.

We have described the process as particularly applicable to beans. It, however, is effective in removing hulls from peas, thus enabling the hulling of many varieties of seeds where the hulls adhere very closely, and it is also applicable in removing the hulls from lentils and will be effective in removing the hulls from any kind of seeds that has a hard close-adhering hull.

Having thus described our invention, what we claim as new, and desire to secure by Letters Patent, is—

1. The process of removing hulls from beans or similar seeds consisting in first, soaking the seed in water until the hulls are swelled; second, drying the same whereby the hull will be loosened from the kernels within; third, passing the same through a rubbing or scouring machine for removing the hulls from the kernels and thereafter separating the hulls from the kernels by any suitable means.

2. The process of removing hulls from beans or similar seeds consisting in first soaking the seed in water until the hulls are swelled; second, drying the same whereby the hull will be loosened from the kernels within; third, passing the same through a rubbing or scouring machine for removing the hulls from the kernels.

3. The process of removing hulls from beans or similar seeds consisting in first, subjecting the same to the action of hot water for a very brief period to expand the hulls only; drying the same whereby the hulls will be loosened from the kernels; and then freeing the hulls from the kernels.

4. The process of removing hulls from beans or similar seeds consisting in first, soaking the seeds in water until the hulls are swelled; second, drying the same whereby the hulls will be loosened from the kernels within; third, removing the loosened hulls from the kernels.

In witness whereof we have hereunto set our hands and seals in the presence of two witnesses.

JOHN HARVEY KELLOGG. [L. S.]
ARTHUR S. KELLOGG. [L. S.]
HERBERT C. JEFFERS. [L. S.]
WILL K. KELLOGG. [L. S.]

Witnesses:
WILFRED C. KELLOGG,
CEREDA LITTLE.